United States Patent [19]

Woolf

[11] Patent Number: 4,746,370
[45] Date of Patent: May 24, 1988

[54] PHOTOTHERMOPHOTOVOLTAIC CONVERTER

[75] Inventor: Lawrence D. Woolf, Carlsbad, Calif.

[73] Assignee: GA Technologies Inc., San Diego, Calif.

[21] Appl. No.: 43,941

[22] Filed: Apr. 29, 1987

[51] Int. Cl.⁴ ............................................. H02N 6/00
[52] U.S. Cl. .................................. 136/246; 136/253; 136/259
[58] Field of Search ..................... 136/246, 253, 259

[56] References Cited

U.S. PATENT DOCUMENTS

| | | | |
|---|---|---|---|
| 3,929,510 | 12/1975 | Kittl | 136/247 |
| 4,234,352 | 12/1983 | Swanson | 136/253 |
| 4,313,024 | 1/1982 | Horne | 136/253 |
| 4,331,829 | 5/1982 | Palazzetti et al. | 136/253 |
| 4,419,532 | 12/1983 | Severns | 136/253 |

OTHER PUBLICATIONS

Fahrenbruch and Bube, Fundamentals of Solar Cells—Photovoltaic Solar Energy Conversion, Academic Press, 1983, pp. 520–530.

Bennett and Olsen, Analysis of Multiple-Cell Concentrator/Photovoltaic Systems, Joint Center for Graduate Study, Richland, Washington, copyright 1978, pp. 868–873 (13th IEEE Photovoltaic Specialists Conference).

Primary Examiner—Aaron Weisstuch
Attorney, Agent, or Firm—Fitch, Even, Tabin & Flannery

[57] ABSTRACT

A photothermophotovoltaic energy conversion system converts solar energy to electrical energy and includes a radiator and a photovoltaic cell. The photovoltaic cell receives incoming energy, including solar energy, and converts a first portion of the incoming energy to electrical energy. The photovoltaic cell includes a reflector for reflecting a second portion of the incoming energy to the radiator to heat it. The heated radiator in turn radiates energy back to the photovoltaic cell for subsequent energy conversion therein of a first portion thereof. A second portion is reflected to the radiator, conserving heat.

18 Claims, 3 Drawing Sheets

PHOTOTHERMOPHOTOVOLTAIC CONVERTER

BACKGROUND OF THE INVENTION

1. Field of the Invention

The present invention pertains to systems for converting thermal and radiant energy into electrical energy, and more particularly, the invention relates to photothermophotovoltaic conversion systems.

2. Description of the Prior Art

Systems for converting solar energy to electrical energy at significant production levels require relatively high efficiencies to attain the requisite specific power (W/kg or W/cm$^2$). Different systems of energy conversion have been proposed in the past, in an attempt to achieve this goal.

Photovoltaic (PV) systems are attractive because they are relatively simple in their construction and operation. However, PV cells used in these systems suffer from the inherent drawback of being unable to convert incoming solar radiation which is below the band gap energy of the cells into electrical energy, and hence that part of the incoming solar spectrum is lost to the photovoltaic system.

An alternative system to photovoltaics is generally known by the term "thermophotovoltaics" (TPV), wherein incoming solar radiation is collected and concentrated by mirrors and/or lenses and is directed onto an intermediate radiator (absorber/emitter) which typically is designed so as to approximate a blackbody emitter. The radiator, in turn, radiates energy onto an array of PV cells which convert the radiation above band gap energy into electrical energy, and reflect the portion below band gap energy back to the radiator, thereby utilizing that portion of the energy spectrum to help to keep the radiator hot. TPV conversion efficiencies approaching 50 percent are theoretically possible. However, TPV conversion efficiencies are extremely sensitive to parasitic system losses, such as losses in the focusing optics, heat losses in the emitter cavity, and losses due to poor reflectivity of the PV cell for below band gap energy. Modeling has shown that the latter-mentioned inefficiency, that of poor reflectivity of the PV cell, would be a primary cause of reduced TPV system performance. For example, poor reflectivity along with small losses (of the order of 10 percent) from the other two types of parasitic losses, typically would reduce TPV conversion efficiencies to below 20 percent.

To date, a preferred system for achieving high solar energy conversion efficiencies uses a multiple band gap solar cell. As in the photovoltaic system described above, only those photons with energy greater than the band gap energy of the cell can be converted into usable electrical energy. However, the energy of a photon which is in excess of the band gap energy is lost as heat in the solar cell, and does not contribute to the useful power output. Therefore, multiple band gap cells are arranged such that incoming light is first incident on the highest band gap portion, and the remaining below band gap energy is then directed to a lower band gap portion, and so forth.

At present, only double band gap cells have been fabricated, and the fabrication of only double or triple band gap cells appears to be possible in light of the complexity and associated difficulties involved. For example, monolithic multiple band gap cells must be fabricated from III-V components such as $(In_{1-x}Ga_x)As$ and $(Al_{1-x}Ga_x)As$. Tunnel junction interconnects must be fabricated between the different band gap materials to collect all the current that is photogenerated. The complexity of fabrication of this type of cell results in expensive production costs. For a variety of reasons, unexpected difficulties in approaching the theoretical efficiencies of multiple band gap cells have been experienced. To date, no multiple band gap cell has been fabricated with an efficiency exceeding that of the better single band gap PV cells.

SUMMARY OF THE INVENTION

It is therefore a principal aspect of the present invention to provide a solar energy conversion system of improved high efficiency which utilizes a single band gap cell for the initial conversion of incoming radiation, in conjunction with a thermophotovoltaic energy conversion subsystem.

These and other aspects, objects, and advantages of the present invention, which will become apparent from the following detailed description and the accompanying drawings, are provided by a photothermophotovoltaic energy conversion system which comprises a PV subsystem in tandem with a TPV subsystem of energy conversion. A single band gap photovoltaic cell is the recipient of radiation from both the PV and TPV subsystems, receiving both incident solar energy and reradiated (TPV) energy.

More particularly, the present invention provides a photothermophotovoltaic energy conversion system for converting solar energy to electrical energy. A photovoltaic cell receives incoming solar energy, and converts a first portion of the incoming energy to electrical energy. The photovoltaic cell has reflecting means for reflecting a second portion of the incoming energy to the radiator, which is heated thereby. The radiator then reradiates energy back to the photovoltaic cell for subsequent energy conversion therein.

BRIEF DESCRIPTION OF THE DRAWINGS

In the drawings, wherein like elements are referenced alike.

DETAILED DESCRIPTION OF THE PREFERRED EMBODIMENT

Figure 1:
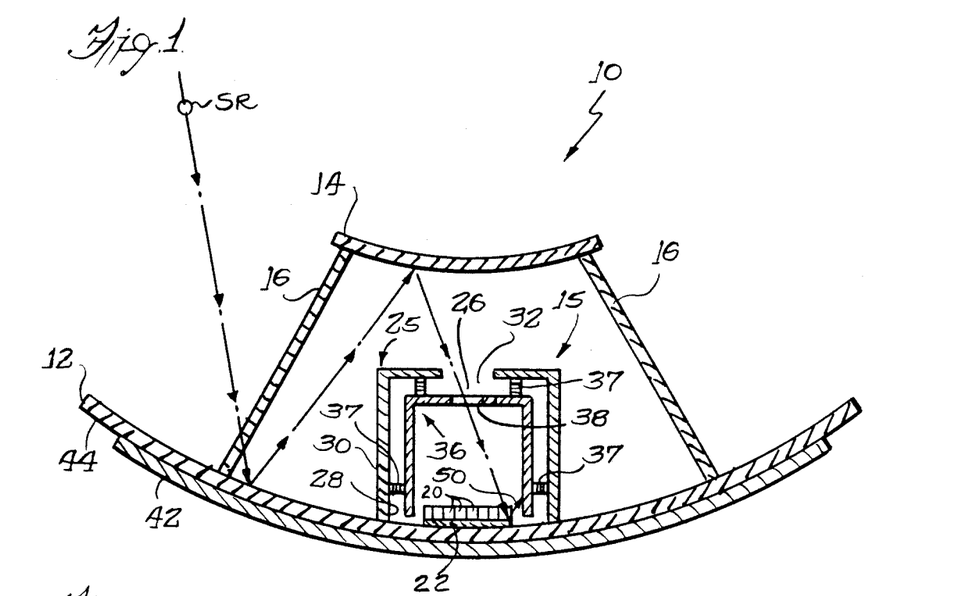
FIG. 1 is a diagrammatic illustration of one embodiment of the energy collector and conversion system of the present invention.

Referring now to the drawings, and especially to FIG. 1, a first illustrative embodiment of a photothermophotovoltaic (PTPV) conversion system 10 of the present invention is shown to include a light collector of the Cassegrain type, having a primary mirror 12 which collects incoming solar radiation and directs the radiation to a secondary mirror 14 which directs the radiation into a PTPV conversion unit 15 where it is converted into electrical energy. Struts 16 support the mirror 14 in fixed relationship to mirror 12.

The conversion unit 15 includes an array of photovoltaic (PV) cells 20 positioned at the center of primary mirror 12. The cells 20 may be of any conventional type suitable for the operating temperatures and frequency spectrum of interest. One example of a cell is given in U.S. Pat. No. 4,234,352. A cell described therein includes a back surface reflector for reflecting incoming below band gap energy radiation back out of the cell. The cell has a highly reflective electrical interconnecting pattern and minimum contact areas for the N+ and P+ layers of the device, which contributes to a high efficiency. Other types of cells will also be readily recognized as applicable to the present invention.

An outer shell 25, attached at one end to primary mirror 12, forms a cavity 26 surrounding the cells 20. The shell 25 has an inner mirrored surface 28 and an outer surface 30 which is, preferably, also mirrored. The shell 25 can also be constructed of a refractory metal or ceramic, but is preferably made of aluminum. An aperture 32 is provided for the entrance of sunlight reflected from the secondary mirror 14 into the interior of the cavity.

A refractory absorber/emitter, or radiator 36, is nested within cavity 26, being supported from the shell 25 by thermally insulative standoffs 37, preferably comprised of a ceramic tube. The radiator 36 has an aperture 38 aligned with the aperture 32 in the shell 25. In the preferred embodiment, the lower end of the radiator 36 is spaced above the mirror 12. If desired, additional thermally-insulative standoffs can be provided to support the lower end of the shell 25 from mirror 12. The radiator 36 may be formed of any material suitable for absorbing incoming radiation and emitting, (reradiating) energy, at least a part of which can be converted by the cells 20 into electricity.

The choices of materials for the radiator 36 and the cells 20 must be determined by their spectral characteristics, since a distinguishing feature of the present invention is that the cells 20 respond not only to incident solar radiation, but also to radiation emitted by the radiator 36. In general, the efficiencies of photovoltaic cells vary with the frequency spectrum of radiation converted by the cells. As is generally known, a photovoltaic cell is limited in its spectral response to radiation frequencies above its band gap frequency. Put another way, photovoltaic cells can convert only that portion of incident energy which is above their band gap energy. Incoming energy below the band gap energy of the cell is not converted to electrical energy, and either heats the cell or passes therethrough.

It is important therefore, that the spectral characteristics of the radiator 36 and photovoltaic cells 20 be matched to each other. The radiator 36 in the preferred embodiment is made from tungsten, erbium oxide, or ytterbium oxide. It will be appreciated by those skilled in the art, that while erbium oxide and ytterbium oxide are selective radiators, emitting electromagnetic energy in relatively narrow spectral bands, their vapor pressures are higher than that of tungsten for a given temperature. In some situations, tungsten or other broadband emitter materials may be chosen to avoid sputtering or other deposition of emitter material onto the surface of the cells 20. As will be seen below, the present invention offers a reduced range of emitter temperature operation, which significantly reduces the risk of photovoltaic cell deterioration, making the use of more selective emitter materials more attractive.

In the first embodiment illustrated above, as well as other embodiments contemplated by the present invention, means are provided for reflecting the below band gap energy to the radiator 36. This is preferably accomplished by a back surface reflective layer on the bottom of the cells 20, but other reflective arrangements, not integral with the cell construction, are possible.

Even with the best photovoltaic cells available today, heat is generated within the cells 20 due to inefficiencies in the conversion process. If left uncontrolled, the heat might reduce cell performance, or even lead to destruction of the cells. To reduce these concerns, the preferred embodiment includes a heat pipe radiator 42, which distributes heat generated in the vicinity of the cells 20 and cavity 26 over nearly the entire back surface 44 of the primary mirror 12. Excessive temperature gradients are thereby avoided with a heat pipe radiator system of relatively small mass.

If desired, a heat mirror such as that described in U.S. Pat. No. 4,234,352, or a selective filter such as that described in U.S. Pat. No. 4,331,829 can be placed between cells 20 and radiator 36. When so positioned, either of these respective devices passes a selected band of radiation to the cells 20, reflecting the remaining energy back to the radiator 36. The selected band is, of course, chosen to lie above the band gap energy of the cells 20, so as to provide the most efficient conversion. The material of the radiator 36 can then be selected from broad band radiating materials, such as tungsten. To reduce complexity and overall system mass to a minimum, the radiator 36 of the preferred embodiment is preferably made of a selective radiative material such as erbium oxide or ytterbium oxide, thereby substantially eliminating the need for the additional devices such as these selective mirrors or selective filters.

In operation, incident solar radiation SR strikes the primary mirror 12. The primary mirror 12 collects and concentrates the radiation, and reflects the radiation onto the secondary mirror 14. The radiation is reflected from and further concentrated by the mirror 14 and directed through the apertures 32, 38 into the cavity 26. The mirrors 12 and 14 constitute a Cassegrain collector system in which the mirror 12 is paraboloidal and the mirror 14 hyperboloidal, with the focal point of the system substantially at the aperture 32 so that substantially all of the collected light goes into the cavity 26 but substantially none goes back out. The entering radiation is either absorbed by the radiator 36 or cells 20, or reflected for further travel within the cavity 26 to the radiator 36. The apertures 32, 38 are made as small as practical to avoid radiation escape through the apertures, in an effort to approximate as closely as possible, a blackbody cavity. Any radiation emitted by the radiator 36 not directed toward the cells 20 is reflected by the mirrored interior 28 of the outer shell 25, back onto the radiator 36, contributing to the heating of the radiator body.

As mentioned above, the cells 20 have means 22 for reflecting below band gap energy back out of the cells. Preferably, the cells 20 are equipped with a back surface reflector for this purpose. The reflected energy, indicated as a ray 50, is directed onto the radiator 36 where it is absorbed, heating the radiator. The heated radiator emits characteristic blackbody radiation onto the cells 20. The cells 20 convert a portion of the received energy to electrical energy by thermophotovoltaic (TPV) action and a portion is again reflected to the radiator 36, conserving heat energy and helping keep the radiator at the desired temperature for radiation. By appropriate design the radiator 36 will be in thermal equilibrium at a temperature that radiates in the desired energy spectrum. The emitting area of the blackbody radiation to the cells 20 is taken, for purposes of the comparison of theoretical efficiencies set forth below, to be equal to the area of cells 20.

Thus, the cells 20, according to the present invention, process all incoming radiation first, making an initial photovoltaic (PV) energy conversion. Thereafter, the cells 20 reflect unconverted energy onto the radiator 36 for subsequent thermophotovoltaic (TPV) energy conversion.

Figure 2:
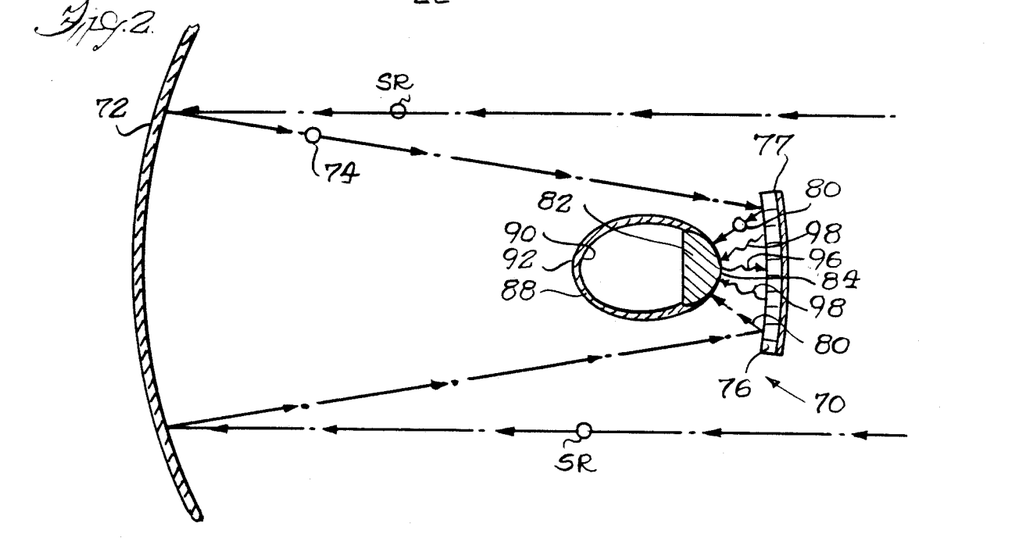
FIG. 2 illustrates another embodiment of the energy collector and conversion system of the present invention.

Referring now to FIG. 2, another illustrated embodiment of the present invention is indicated generally at 70. Solar radiation SR is concentrated by a primary mirror 72. The reflected sunlight, as indicated by a ray 74, is directed onto cells 76 which reflect below band gap energy photons 80, as in the illustrated embodiment of FIG. 1. Cells 76 are provided with a back surface reflector layer 77 for this purpose. A percentage of the energy of the photons 80 is absorbed by a blackbody radiator 82 having a transmitting surface 84 facing cells 76. The remaining surface of the radiator 82 is enclosed by a reflective wall 88 having an inner reflective surface 90 which retains the heat of the radiator 82 not emitted from the transmitting surface 84.

As in the system of FIG. 1, the radiator 82 emits energy as shown by the rays 96 onto the cells 76. As shown by the rays 98, the below band gap portion of this energy is reflected onto the radiator 82 which again absorbs a portion of the energy.

Figure 3:
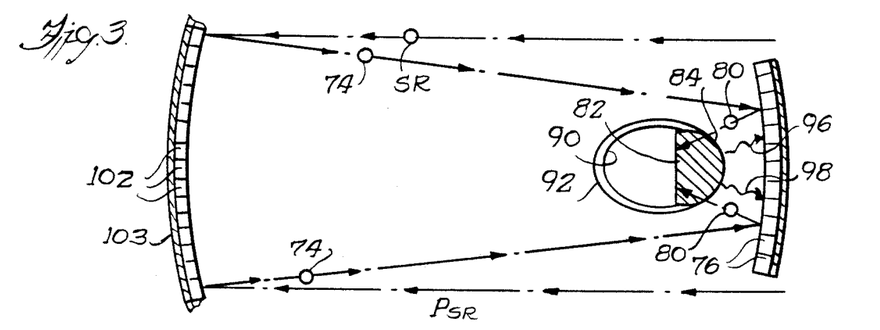
FIG. 3 is a diagrammatic illustration of another alternative embodiment of the present invention, similar to that of FIG. 2, but having photovoltaic cells with back surface reflectors comprising the primary concentrating mirror.

Before comparing efficiencies of various systems with the system of FIG. 2, two alternative embodiments of the present invention will be discussed. FIG. 3 shows a collector system substantially identical to that of FIG. 2, except that primary mirror 72 is replaced by photovoltaic cells 102 having reflector means 103, like the back surface reflector layer 77, as shown in the illustrated embodiment of FIG. 2. The cells 102 must be arranged in a configuration which concentrates and reflects solar radiation onto the cells 76. All other aspects of the system of FIG. 3 are identical to those of FIG. 2. In effect, a tandem-type of multiple band gap collector system has been provided upstream of the radiator 82. Energy 74 is the reflected below band gap energy not converted by cells 102. The band gap energy of cells 76 should therefore be lower than the band gap energy of cells 102.

Figure 4:
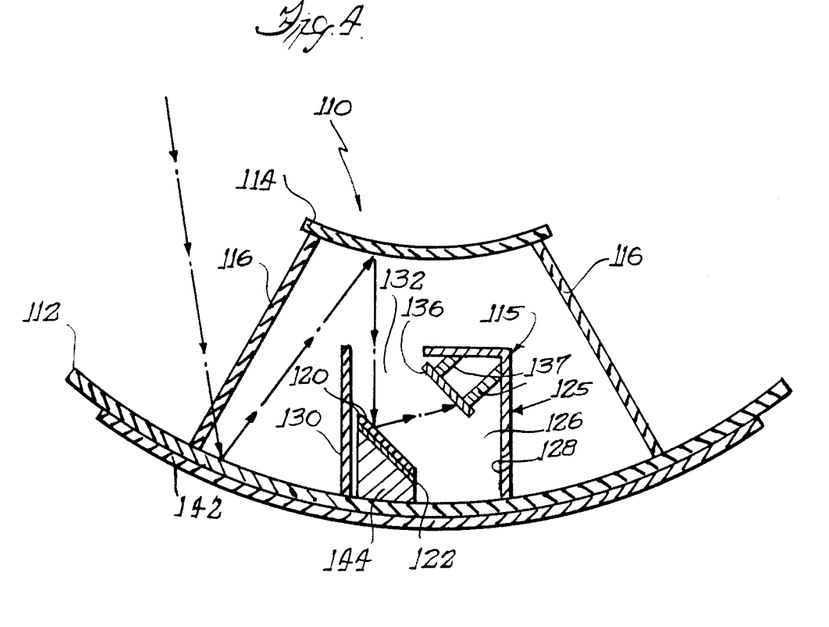
FIG. 4 illustrates yet another embodiment of the energy collector and conversion system of the present invention.

Referring now to FIG. 4, an alternative embodiment of the present invention is illustrated with reference to system 110 which, as described before, includes a light collector of the Cassegrain type, having a primary mirror 112 which collects incoming solar radiation, directing the radiation to a secondary mirror 114, which in turn directs the radiation into a PTPV conversion unit 115, where it is converted into electrical energy. Struts 116 support the mirror 114 in fixed relationship to the primary mirror 112.

A conversion unit 115 includes an array of PV cells 120 positioned at the center of primary mirror 112. The cells 120 are of a conventional type, being chosen for the operating temperatures and frequency spectrum of interest. Examples of such cells are given above with reference to FIG. 1.

An outer shell 125 has an outer end secured to primary mirror 112, forming a cavity 126 surrounding the PV cells 120. Shell 125 has an inner mirrored surface 128 and an outer surface 130 which is, preferably, also mirrored. Shell 125 is preferably made of aluminum, but may also be constructed of a refractory metal or ceramic. An aperture 132 aligned between secondary mirror 114 and cells 120 provides entrance of reflected sunlight into the interior of cavity 126.

Nested within the cavity 126 is a radiator or refractory absorber/emitter 136. Radiator 136 is supported from shell 125 by thermally insulative standoffs 137. Radiator 136 is formed of any material suitable for absorbing incoming radiation and emitting or reradiating energy, at least a part of which can be converted by cells 120 into electricity. The choice of radiator material should be made according to the guidelines set forth above with respect to embodiment 10 of FIG. 1.

The array of PV cells 120 includes a back surface reflector 122 which reflects incoming radiation, not already converted, onto the surface of radiator 136. The PV cells 120 are supported by a support 144 formed of high thermal conductivity material, such as sapphire, aluminum or aluminum nitride, so as to provide cooling for the PV cells and their back surface reflector. Preferably, the support has a mounting surface angled toward radiator 136. As illustrated in FIG. 4, the radiator 136 is preferably supported at one corner of shell 125 so as to capture a maximum amount of radiation entering into cavity 126 through aperture 132.

The following discussion compares the theoretical efficiencies of the photothermophotovoltaic (PTPV) system of the present invention with the theoretical efficiencies of two alternative systems—thermophotovoltaic (TPV) and photovoltaic (PV). In TPV systems, incoming solar radiation does not strike the photovoltaic cells directly. Rather, all incoming energy is directed onto a radiator which thereafter reradiates the energy onto the photovoltaic cells.

The PTPV system of the present invention, as described above, provides an arrangement in which sunlight, which may or may not have undergone concentration, impinges on a photovoltaic cell with a back surface reflector or the like reflector means. The above band gap radiation is converted into electricity. The below band gap radiation is reflected to a blackbody absorber/emitter, which heats the blackbody to an equilibrium temperature. The blackbody emits radiation onto the same cell or a second photovoltaic cell with a back surface reflector. The above band gap radiation is converted into electricity while the below band gap radiation is reflected back to the blackbody.

As will now be shown, a single cell, single band gap PTPV system can have a considerably higher efficiency than either a PV system or a TPV system, while being much less susceptible to parasitic losses than a TPV system. The following discussions of theoretical conversion efficiencies (for each of the PTPV, TPV and PV systems) were used to arrive at the comparisons of Table 1 below, and FIGS. 5 and 6.

THEORETICAL PTPV CONVERSION EFFICIENCIES

With reference to FIG. 1, the following discussions of theoretical efficiencies are made with reference to a PTPV system in which sunlight is concentrated by a mirror with reflectivity $R_o$ to a concentration of C. The focused light impinges on cells 20 which reflect below band gap energy photons with reflectivity $R_c$. A fraction A of the reflected below band gap energy light is absorbed by the radiator 36. The radiator radiates energy as a blackbody radiator to attain an equilibrium temperature $T_E$. This blackbody radiation impinges on the same cells 20 which again reflect the below band gap blackbody radiation back to the radiator 36 with reflectivity $R_c$. A fraction A of this radiation is absorbed by the radiator 36. The emitting area of the radiator 36 whose radiation falls on the cells 20 is taken to be equal to the area of the cells 20.

The sun is taken to be a blackbody with a color temperature of $T_s = 5762$ K. The system is assumed to be in space where the AM0 (Air mass zero) solar fluence or power is $$P_{sol} = 0.1353 \ W/cm^2 = \int_0^\infty P_{sol}(\omega) d\omega, \quad (1)$$

where $\omega$ is the angular frequency of the solar radiation. Now $$P_{sol} = 2.165 \times 10^{-5} \frac{\hbar}{4\pi^2 c^2} \int_0^\infty \frac{\omega^3}{e^{\hbar\omega/k_B T_s} - 1} d\omega, \quad (2)$$

$$= 2.165 \times 10^{-5} \sigma T_s^4$$

where $\sigma$ is Stefan's constant ($\sigma = 5.669 \times 10^{-12}$ W/(cm²K⁴)), e is the base of natural logarithms, h is Planck's constant, and $\hbar = h/2\pi$, c is the speed of light, and $k_B$ is Boltzmann's constant. Therefore, $$P_{sol} = 2.165 \times 10^{-5} \frac{\hbar}{4\pi^2 c^2} \int_0^\infty \frac{\omega^3}{e^{\hbar\omega/k_B T_s} - 1} d\omega, \quad (3)$$

or $$P_{sol} = 2.081 \times 10^{-2} \frac{W}{cm^2} \int_0^\infty \frac{u^3}{e^u - 1} du, \quad (4)$$

where $u = \hbar\omega/(k_B T_s)$.

The equilibrium blackbody emitter temperature of the radiator 36 can be determined by equating the power absorbed to the power emitted. Since the cells 20 absorb all the incident sunlight with energy greater than the band gap energy, $E > E_g$, the power absorbed by the radiator is due in part to the remaining portion of the solar spectrum. The additional power absorbed by the radiator is due to below band gap energy reflected blackbody radiation. Therefore the power absorbed by the radiator, $P_{AB}$, can be given by $$P_{AB} = ACR_o R_c \times 2.165 \times 10^{-5} \times \quad (5)$$

-continued $$\frac{\hbar}{4\pi^2 c^2} \int_0^{\omega_g} \frac{\omega^3}{e^{\hbar\omega/k_B T_s} - 1} d\omega +$$

$$\epsilon A R_c \frac{\hbar}{4\pi^2 c^2} \int_0^{\omega_g} \frac{\omega^3}{e^{\hbar\omega/k_B T_E} - 1} d\omega,$$

where A is the fraction of radiation incident on the blackbody that is absorbed by the blackbody, c is the speed of light, $R_o$ is the reflectivity of the mirror 12, $R_c$ is the reflectivity of the cells 20 in the below band gap energy regime, $\omega_g$ is the band gap frequency, equal to $E_g/\hbar$, and $T_E$ is the equilibrium temperature. Using Eq. (2) and the fact that $$\frac{\hbar}{4\pi^2 c^2} \int_0^\infty \frac{\omega^3}{e^{\hbar\omega/k_B T_E} - 1} d\omega = \sigma T_E^4, \quad (6)$$

then Eq. (5) can be rewritten as $$P_{AB} = \quad (7)$$

$$ACR_o R_c \left[ 0.1353 - 2.081 \times 10^{-2} \int_{\beta_s}^\infty \frac{u^3}{e^u - 1} du \right] \frac{W}{cm^2} +$$

$$\epsilon A R_c \left[ \sigma T_E^4 - 8.72 \times 10^{-13} \frac{W}{cm^2 K^4} T_E^4 \int_{\beta_E}^\infty \frac{u^3}{e^u - 1} du \right],$$

where $\epsilon$ is the emissivity of the radiator, $\beta_s = E_g(k_B T_s)$ and $\beta_E = E_g/(k_B T_E)$. Since $\beta_s$ and $\beta_E$ are both typically greater than 3, the approximation of $e^u - 1 \rightarrow e^u$ may be used in the integrals in Eq. (7). Therefore, Eq. () may be rewritten as $$P_{AB} = ACR_o R_c [0.1353 - 2.081 \times \quad (8)$$

$$10^{-2} e^{-\beta_s}(\beta_s^3 + 3\beta_s^2 + 6\beta_s + 6)] W/cm^2 + \epsilon A R_c [\sigma T_E^4 - 8.72 \times$$

$$10^{-13} W/(cm^2 K^4) T_E^4 e^{-\beta_E} (\beta_E^3 + 3\beta_E^2 + 6\beta_E + 6)].$$

The power emitted by the radiator, $P_{EB}$, is taken to be $$P_{EB} = \epsilon \sigma T_E^4. \quad (9)$$

Thus, by equating the power absorbed with the power emitted by the blackbody, the equilibrium blackbody emitter temperature may be determined as $$T_E^4 = \frac{AR_c}{\epsilon \sigma} \{CR_o [0.1353 - 2.081 \times \quad (10)$$

$$10^{-2} e^{-\beta_s}(\beta_s^3 + 3\beta_s^2 + 6\beta_s + 6)] W/cm^2 + \epsilon[\sigma T_E^4 - 8.72 \times$$

$$10^{-13} W/(cm^2 K^4) T_E^4 e^{-\beta_E} (\beta_E^3 + 3\beta_E^2 + 6\beta_E + 6)]\}.$$

Now, the photogenerated current density in the cells 20 arises from both the incident solar as well as the incident blackbody radiation. The focused sunlight contributes a photogenerated current density of $$J_{phs} = \frac{CR_o A}{4\pi^2 c^2} \int_{\omega_g}^{\infty} \frac{\omega^2}{e^{\hbar\omega/k_B T_S} - 1} d\omega, \quad (11)$$

where q is the charge of the electron. Using the approximation $e^u - 1 \triangleq e^u$, Eq. 11 can be rewritten as $$J_{phs} = CR_o(2.189 \times 10^{-13} A/(cm^2 K^3)) T_S^3 \cdot [e^{-\beta_s}(\beta_s^2 + 2\beta_s + 2)]. \quad (12)$$

The emitted blackbody radiation from the radiator 36 contributes a photogenerated current density of $$J_{phE} = \frac{q\epsilon}{4\pi^2 c^2} \int_{\omega_g}^{\infty} \frac{\omega^2}{e^{\hbar\omega/k_B T_E} - 1} d\omega, \quad (13)$$

which can be rewritten as $$J_{phE} = \epsilon(1.011 \times 10^{-8} A/(cm^2 K^3)) T_E^3 [e^{-\beta_E}(\beta_E^2 + 2\beta_E + 2)]. \quad (14)$$

The total photogenerated current density is given by $$J_{ph} = J_{phs} + J_{phE}. \quad (15)$$

The current/voltage characteristics of the cell are taken to obey the standard diode equation $$J = J_{ph} - J_o \left[ \exp\left(\frac{qV}{k_B T_c}\right) - 1 \right], \quad (16)$$

where $$J_o = B_o \exp\left(-\frac{E_g}{k_B T_c}\right). \quad (17)$$

Here $T_c$ is the cell temperature, V is the terminal voltage, J is the current per unit area, and, following Bennett and Olsen, *Analysis of multiple cell concentrator/photovoltaic systems*, 13th IEEE Photovoltaic Specialists Conference, 1978, p. 868, $B_o$ is assumed to equal $10^6$ Amperes per square centimeter (A/cm²) where the electrical power output per unit area is $$P_{out} = JV. \quad (18)$$

The values of J and V, which maximize the power output $P_{mp}$ are $J_{mp}$ and $V_{mp}$.

The overall PTPV system efficiency is given by the maximum power output divided by the power input into the system $$\eta_{PTPV} = \frac{P_{mp}}{P_{in}}. \quad (19)$$

Since the incident sunlight is focused with concentration factor C, this can be rewritten as $$\eta_{PTPV} = \frac{J_{mp} V_{mp}}{C(0.1353 \ W/cm^2)}. \quad (20)$$

An approximate indication of the degree to which the solar radiation and the blackbody radiation each contributes to the overall efficiency can be determined by assuming that power output due to each source is proportional to the photogenerated current from that source. Then, the solar contribution to the efficiency can be written as $$\eta_{PTPVs} = \eta_{PTPV} \frac{J_{phs}}{J_{ph}}, \quad (21)$$

and the blackbody contribution to the efficiency can be written as $$\eta_{PTPVE} = \eta_{PTPV} \frac{J_{phE}}{J_{ph}}. \quad (22)$$

TPV THEORETICAL EFFICIENCY

To investigate the relative efficiency of comparable PTPV and themophotovoltaic (TPV) systems, a theory for TPV similar to that previously presented for PTPV was developed. Sunlight is focused by a mirror with reflectivity $R_o$ to a concentration factor of C. The focused solar radiation impinges on a blackbody radiator, or emitter/absorber. A fraction A of this radiation is absorbed by the blackbody, which is heated to an equilibrium temperature, $T_E$. The blackbody, in turn, emits radiation onto a TPV cell. The below band gap energy blackbody radiation is reflected back to the blackbody with a reflectivity of $R_c$. A fraction A of this radiation is absorbed by the blackbody. Again, the emitting area of the blackbody is taken to be equal to the area of the cell.

Therefore, the power absorbed by the blackbody is $$P_{AB} = AR_o C(0.1353 \ W/cm^2) + \quad (23)$$

$$\epsilon A R_c \frac{\hbar}{4\pi^2 c^2} \int_0^{\omega_g} \frac{\omega^3}{e^{\hbar\omega/k_B T_E} - 1} d\omega.$$

Using the approximations previously cited, this can be rewritten as $$P_{AB} = AR_o C(0.1353 \ W/cm^2) + \epsilon A R_c \sigma T_E^4 - \epsilon A R_c (8.72 \times \quad (24)$$

$$10^{-13}) T_E^4 e^{-\beta_E} (\beta_E^3 + 3\beta_E^2 + 6\beta_E + 6) \ W/(cm^2 K^4).$$

The power emitted by the blackbody is given by $$P_{EB} = \epsilon \sigma T_E^4. \quad (25)$$

Then the equilibrium blackbody temperature is determined from equating $P_{AB}$ and $P_{EB}$ yielding $$T_E^4 = \frac{A}{\epsilon \sigma} [R_o C (0.1353 \ W/cm^2) + \epsilon R_c \sigma T_E^4 - \quad (26)$$

$$\epsilon R_c (8.72 \times 10^{-13}) T_E^4 e^{-\beta_E} (\beta_E^3 +$$

$$3\beta_E^2 + 6\beta_E + 6) \ W/cm^2 K^4)].$$

The total phogenerated current is given by $$J_{ph} = \epsilon \left( 1.011 \times 10^{-8} \frac{A}{cm^2 K^3} \right) T_E^3 e^{-\beta_E} (\beta_E^2 + 2\beta_E + 2), \quad (27)$$

and the overall TPV system efficiency is determined from $$\eta_{TPV} = \frac{J_{mp}V_{mp}}{C(0.1353 \ W/cm^2)} . \quad (28)$$

In conjunction with Eqs. (16) and (17), these equations yield the TPV efficiency.

PV THEORETICAL EFFICIENCY

In order to compare the efficiency of a photovoltaic (PV) concentrator system with that of a PTPV system, a comparable theory was developed, similar to that discussed by others. For this PV system, sunlight is assumed to be concentrated by a mirror with a reflectivity of $R_o$ to a concentration of C. Then the photogenerated current can be written as $$J_{ph} = CR_o(2.189 \times 10^{-13} A/cm^2 K^3) T_s^3 e^{-\beta_s}(\beta_s^2 + 2\epsilon_s + 2), \quad (29)$$

and the PV conversion efficiency is $$\eta_{PV} = \frac{J_{mp}V_{mp}}{C(0.1353 \ W/cm^2)} . \quad (30)$$

Using these equations in conjunction with Eqs. (16) and (17), $\eta_{PV}$ can be calculated.

COMPARISON OF THEORETICAL EFFICIENCIES

The results of computer models based on the preceding theories are tabulated in Table 1. For various values of solar concentration C, concentrating mirror reflectivity $R_o$, cell reflectivity $R_c$, and emitter absorptivity A, the equilibrium emitter temperature $T_E$, optimum efficiency n, and associated optimum band gap $E_g$, are presented. In all cases, an emitter emissivity $\epsilon = 1$ is assumed. These results are illustrated in graphical form in FIG. 5, for $R_o = 0.95$, $A = 0.95$, $T_C = 300$ K, $E_g = 1.4$ eV and C = 1000 AMO.

Figure 5:
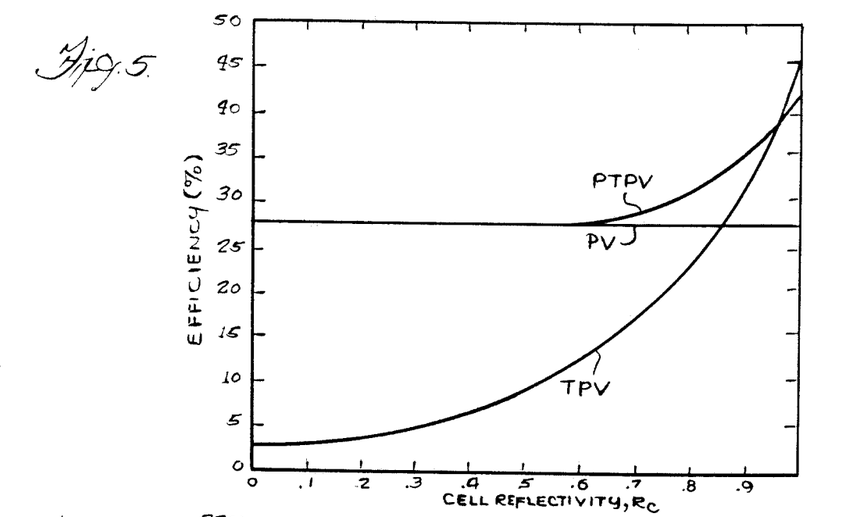
FIG. 5 is a diagrammatic illustration of three efficiency curves comparing the photothermophotovoltaic (PTPV) collector system of the present invention with thermophotovoltaic (TPV) and photovoltaic (PV) collector systems.

As is evident from the table, and from FIG. 5, the PTPV efficiency is always greater than or equal to the PV efficiency, for the former subsumes the latter. For the parameters listed, the PTPV efficiency is also greater than the TPV efficiency for practical values of $R_c$ and A, because at low values the efficiency of the TPV is less than the constant PV efficiency. At very high values larger than 0.97, the TPV efficiency is so much greater than the PV efficiency that it would be better not to use the PV conversion at all. Such high values of $R_c$ are practically unattainable, making the PTPV combination the best of all.

Figure 6:
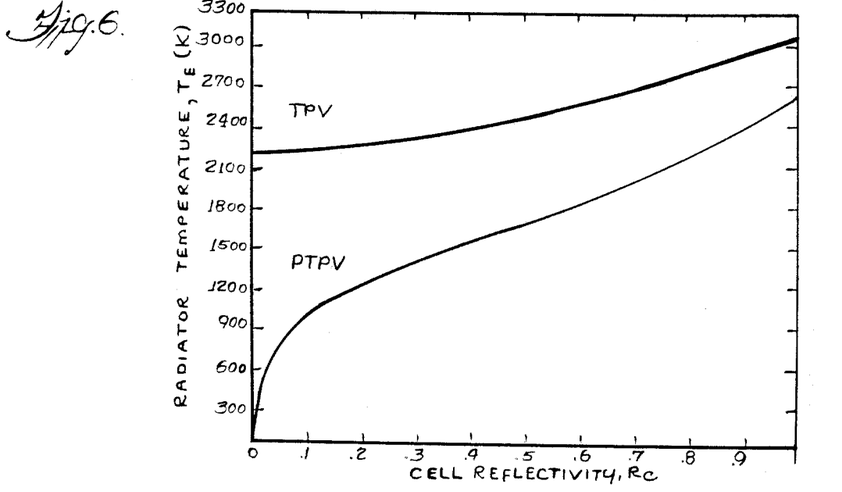
FIG. 6 is a diagram of emitter temperature versus cell reflectivity for the photothermophotovoltaic (PTPV) system of the present invention, compared to thermophotovoltaic (TPV) systems.

FIG. 6 is a graph of radiator temperature, $T_E$ versus cell reflectivity $R_c$ for the same conditions as FIG. 5. Namely, as illustrated in FIG. 6, the temperature of the radiator $T_E$ is significantly lower for PTPV systems than for TPV systems. As is evident from the graph of FIG. 6, a substantial portion of incident energy is converted in the initial pass through the photovoltaic cell, and hence never reaches the radiator. Lower radiator operating temperatures permit the use of selective radiator materials such as erbium oxide or ytterbium oxide which have a higher vapor pressure than broader band radiating materials, such as tungsten. Thus, it is possible that selective radiator materials may be used in the PTPV conversion systems of the present invention, even where photovoltaic cell fouling has been experienced in TPV cells.

Various other changes and modifications may be made in the above-described apparatus without deviating from the spirit and scope of the present invention, various features of which are set forth in the accompanying claims.

TABLE 1

| COMPARISON OF PV, TPV, AND PTPV | | | | | | | |
|---|---|---|---|---|---|---|---|
| C | $R_o$ | $R_c$ | A | $T_E$ (K) | $E_g$ (eV) | $\eta$ (Percent) | Type of Conversion System |
| 100 | 0.8 | — | — | — | 1.4 | 21.9 | PV |
| 100 | 0.8 | 0.9 | 0.8 | 1361 | 0.6 | 8.9 | TPV |
| 100 | 0.8 | 0.9 | 0.8 | 1157 | 1.4 | 21.9 | PTPV |
| 100 | 0.9 | — | — | — | 1.4 | 24.7 | PV |
| 100 | 0.9 | 0.95 | 0.95 | 1673 | 0.8 | 23.8 | TPV |
| 100 | 0.9 | 0.95 | 0.95 | 1553 | 1.3 | 26.4 | PTPV |
| 200 | 0.9 | — | — | — | 1.4 | 25.2 | PV |
| 200 | 0.9 | 0.95 | 0.95 | 1953 | 0.9 | 27.8 | TPV |
| 200 | 0.9 | 0.95 | 0.95 | 1859 | 1.4 | 28.9 | PTPV |
| 500 | 0.8 | — | — | — | 1.4 | 22.9 | PV |
| 500 | 0.8 | 0.9 | 0.9 | 2149 | 0.9 | 21.3 | TPV |
| 500 | 0.8 | 0.9 | 0.9 | 1842 | 1.3 | 24.9 | PTPV |
| 500 | 0.9 | — | — | — | 1.3 | 25.8 | PV |
| 500 | 0.9 | 0.95 | 0.95 | 2434 | 1.1 | 32.6 | TPV |
| 500 | 0.9 | 0.95 | 0.95 | 2202 | 1.4 | 33.1 | PTPV |
| 1000 | 0.8 | — | — | — | 1.3 | 23.3 | PV |
| 1000 | 0.8 | 0.9 | 0.8 | 2285 | 0.8 | 18.2 | TPV |
| 1000 | 0.8 | 0.9 | 0.8 | 1943 | 1.3 | 25.0 | PTPV |
| 1000 | 0.9 | — | — | — | 1.3 | 26.3 | PV |
| 1000 | 0.9 | 0.9 | 0.9 | 2569 | 1.0 | 27.8 | TPV |
| 1000 | 0.9 | 0.9 | 0.9 | 2259 | 1.4 | 30.8 | PTPV |
| 1000 | 0.9 | — | — | — | 1.3 | 26.3 | PV |
| 1000 | 0.9 | 0.95 | 0.95 | 2816 | 1.2 | 35.9 | TPV |
| 1000 | 0.9 | 0.95 | 0.95 | 2582 | 1.5 | 36.4 | PTPV |

What is claimed is:

1. A photothermophotovoltaic energy conversion system for converting solar energy to electrical energy, comprising:
   a radiator; and
   photovoltaic cell means for receiving incoming electromagnetic radiant energy including said solar energy and converting a first portion of said incoming energy to electrical energy and having reflecting means for reflecting a second portion of said incoming energy to said radiator;
   said radiator being disposed to receive said second portion of said energy from said at least one photovoltaic cell and be heated thereby for radiating energy back to said photovoltaic cell means for subsequent energy conversion therein.

2. The conversion system of claim 1 wherein said photovoltaic cell means includes at least one photovoltaic cell and said reflecting means comprises a back-surface reflector layer of said at least one photovoltaic cell.

3. The conversion system of claim 2 further comprising collector means for collecting and concentrating solar energy, and directing concentrated solar energy onto said at least one photovoltaic cell.

4. The conversion system of claim 3 wherein said collector means comprises a light-concentrating mirror.

5. The conversion system of claim 4 wherein said photovoltaic cell means further comprises a plurality of photovoltaic cells partially surrounding said radiator and opening toward said mirror.

6. The conversion system of claim 5 further wherein said radiator includes a body having a radiative surface with a first portion facing said at least one photovoltaic cell and a second portion surrounded by a reflective wall, said reflective wall reflecting energy radiated by said second portion back to said radiator whereby substantially all of the net energy radiated from said body is directed toward said at least one photovoltaic cell.

7. The conversion system of claim 3 wherein said collector means comprises a primary light-concentrating mirror and a secondary mirror arranged to form a Cassegrain collector.

8. The conversion system of claim 7 wherein said radiator substantially surrounds said at least one photovoltaic cell and has an energy-receiving aperture opening to admit light from said secondary mirror.

9. The conversion system of claim 8 wherein said radiator is surrounded by a reflective wall spaced from said radiator by thermal insulative means.

10. The conversion system of claim 9 wherein said radiator comprises tungsten.

11. The conversion system of claim 9 wherein said radiator comprises erbium oxide.

12. The conversion system of claim 9 wherein said radiator comprises ytterbium oxide.

13. The conversion system of claim 7 further comprising a heat pipe radiator to direct heat from said at least one photovoltaic cell.

14. The conversion system of claim 13 wherein said at least one photovoltaic cell is mounted on a reflective surface of said primary mirror.

15. A method of converting solar energy to electrical energy, comprising:

receiving incoming electromagnetic radiant energy including solar energy with photovoltaic cell means;

converting a first portion of said incoming energy to electrical energy in said photovoltaic cell means;

reflecting a second portion of said incoming energy; and receiving said reflected second portion of said incoming energy with a radiator to heat said radiator so as to radiate energy back to said photovoltaic cell means for subsequent energy conversion therein.

16. The method of claim 15 wherein said reflecting step includes the step of providing at least one photovoltaic cell having a back-surface reflector layer for reflecting said second portion of said incoming energy.

17. A method of claim 16 wherein said step of receiving incoming electromagnetic radiant energy includes collecting and concentrating said solar energy and directing concentrated solar energy to said photovoltaic cell means.

18. A method of claim 17 further comprising the step of at least partially surrounding said photovoltaic cell means with said radiator; and providing an energy-receiving aperture in said radiator for receiving said concentrated solar energy therethrough.

* * * * *

UNITED STATES PATENT AND TRADEMARK OFFICE
CERTIFICATE OF CORRECTION

PATENT NO. : 4,746,370                                       Page 1 of 2
DATED       : May 24, 1988
INVENTOR(S) : Lawrence D. Woolf It is certified that error appears in the above-identified patent and that said Letters Patent is hereby corrected as shown below:

Column 1, line 58, after "output" insert a period.

Column 7, line 37, change "$e^{hw}$" to --$e^{\hbar w}$--;

line 47, change "$e^{hw}$" to --$e^{\hbar w}$--.

Column 8, line 3, change "$e^{hw}$" to --$e^{\hbar w}$--;

line 9, change "$e^{hw}$" to --$e^{\hbar w}$--;

line 36, change "$Eg(K_B T_s)$" to --$Eg/(K_B T_s)$--;

line 39, change "()" to --(7)--.

Column 9, line 6, change "$\Delta$" to --"$\rightarrow$"--;

line 9, change "$A/(\overline{cm}^2 K^3)$" to --$A/(cm^2 K^3)$--.

Column 10, line 17, change "themophotovoltaic" to --thermophotovoltaic--;

line 61, change "phogenerated" to --photogenerated--.

UNITED STATES PATENT AND TRADEMARK OFFICE
CERTIFICATE OF CORRECTION

PATENT NO. : 4,746,370

DATED : May 24, 1988

INVENTOR(S) : Lawrence D. Woolf

It is certified that error appears in the above-identified patent and that said Letters Patent is hereby corrected as shown below:

Column 11, line 19, change "$2\epsilon_s$" to --$2\beta_s$--;

line 35, change "n" to --$\eta$--.

Signed and Sealed this

Third Day of January, 1989

*Attest:*

DONALD J. QUIGG

*Attesting Officer*

*Commissioner of Patents and Trademarks*